US005854847A

United States Patent [19]

Yoshida et al.

[11] Patent Number: 5,854,847

[45] Date of Patent: Dec. 29, 1998

[54] SPEAKER SYSTEM FOR USE IN AN AUTOMOBILE VEHICLE

[75] Inventors: Minoru Yoshida; Keishi Saito; Fumio Matsushita; Katsumi Amano; Satoshi Kumada; Yoshiki Ohta, all of Saitama-ken, Japan

[73] Assignee: Pioneer Electronic Corp., Tokyo, Japan

[21] Appl. No.: 15,796

[22] Filed: Jan. 29, 1998

[30] Foreign Application Priority Data

Feb. 6, 1997 [JP] Japan .................................... 9-024081

[51] Int. Cl.[6] ........................................ H04B 1/00

[52] U.S. Cl. ................................ 381/302; 381/27; 381/86

[58] Field of Search .................................... 381/86, 1, 27, 381/300, 302

[56] References Cited

U.S. PATENT DOCUMENTS 4,408,095 10/1983 Ariga ........................................ 381/27
5,197,100 3/1993 Shiraki ...................................... 381/27
5,325,435 6/1994 Data .......................................... 381/86
5,610,986 3/1997 Miles ......................................... 381/27
5,710,818 1/1998 Yamato ..................................... 381/86

*Primary Examiner*—Minsun Oh Harvey
*Attorney, Agent, or Firm*—Nikaido, Marmelstein, Murray & Oram LLP

[57] ABSTRACT

A speaker system for use in an automobile vehicle, comprises: pair of side speakers disposed on left and right sides in a front section within the automobile vehicle; a central speaker disposed in a middle position between the two side speakers; a pair of delay circuits connected on two signal lines leading to the side speakers disposed on the left and right sides within the vehicle; an adder connected between the left and right channels to add together the electric signals transmitted from the left and right channels so as to produce a sum signal; and a band pass filter connected on a signal line leading to the central speaker, said band pass filter being constructed and adjusted to eliminate a high frequency signal component. The sum signal fed from the adder is passed through the band pass filter before being applied to the central speaker.

5 Claims, 3 Drawing Sheets

SPEAKER SYSTEM FOR USE IN AN AUTOMOBILE VEHICLE

BACKGROUND OF THE INVENTION

The present invention relates to a speaker system, in particular to a speaker system for use in an automobile vehicle.

It has been known that a speaker system for use in an automobile vehicle is usually a multi-speaker system, such as that shown in FIG. 3.

Referring to FIG. 3, a conventional multi-speaker system comprises a plurality of speakers 4 disposed in a front section, side doors 2 and a rear tray 3 within an automobile vehicle 1. With the use of such an arrangement, it is possible for an entire area within the vehicle to obtain a uniform sound pressure, enabling all the persons staying in the vehicle to easily and similarly enjoy music or the like.

However, there is a problem with the conventional multi-speaker system illustrated in FIG. 3. Namely, in use of the speaker system, there are primary sounds emitted directly from individual speakers 4 and secondary sounds generated when the primary sounds are reflected from inner wall of the automobile vehicle. Since the primary sounds and the secondary sounds will be unavoidably synthesized together, there is always a fluctuation in the frequency characteristic of the multi-speaker system (due to a reflection synthesizing effect), resulting in a complex peak/dip phenomenon in audible frequency bands.

To alleviate the problem caused by the reflection synthesizing effect, it is necessary to simplify the sound sources involved in a multi-speaker system. Namely, the number of speakers (serving as sound sources) should be made as fewer as possible and these speakers should be arranged in only one direction. Further, to ensure an audio effect similar to a music listening room, it is important to satisfy the following requirements.

(a) A sound image should be located in the front.

(b) A sound image deviation caused due to different seat positions within an automobile vehicle should be eliminated.

(c) A peak/dip phenomenon caused due to the reflection synthesizing effect should be eliminated.

In the multi-speaker system shown in FIG. 3, since the speakers are disposed in every direction, it is difficult to have the sound image located in the front within a vehicle. Therefore, it is understood that the sound image may be located in the front only when the speakers are located in a front section in a vehicle. In other words, if an automobile speaker system is used which includes a pair of speakers disposed only on opposite sides of a front section in a vehicle, it is sure to obtain some improvement in locating the sound image in the front within an automobile vehicle.

Nevertheless, there is also a problem with an automobile speaker system including a pair of speakers disposed only on opposite sides of a front section in a vehicle. Namely, although a pair of speakers are disposed only on opposite sides in the front, for a driver sitting on the right and another person sitting on the left in the vehicle, a sound image will be either left-going or right-going, always deviating from a desired position. As a result, it is still difficult to obtain a truly desired sound image fixedly located in a predetermined position (in the front within a vehicle).

In order to solve the above problem, Japanese Patent Application Laid-open No. 51-52802 discloses an improved automobile speaker system which includes a pair of side speakers capable of converting electric signals transmitted from left/right channels into audio signals, a central speaker (also capable of converting electric signals transmitted from left/right channels into audio signals) disposed in a middle position between the pair of side speakers. Further, each one of the pair of side speakers is connected with a delay circuit.

In use of the speaker system disclosed in Japanese Patent Application Laid-open No. 51-52802, sound signals from the side speakers will be delayed as compared with the sound signals from the central speaker. Namely, with the effect of the delay circuits, sound emitted from the central speaker will reach the listeners earlier than the sound emitted from the side speakers. As a result, as far as the listeners are concerned, it seems as if the side speakers are located farther away than the central speaker. In this way, although there are a plurality of sound sources, for the listeners it seems as if there is only one sound source which emits sound earlier than the others. Consequently, the sound image is induced to the sound signal emitted from the central speaker, and located close to the central speaker between the two side speakers.

However, with the speaker system disclosed in Japanese Patent Application Laid-open No. 51-52802, although it is possible to have a sound image located in a position between two side speakers in a front section within an automobile vehicle, it has been proved difficult to obtain a good feeling of desired sound spreading. In order to ensure such a desired feeling of sound spreading, it has been suggested that an attenuator be connected on a signal line leading to the central speaker so as to reduce the level of the electric signals being applied to the central speaker. In this way, a sound spreading feeling may be improved to some extent. But, since the attenuator reduces the sound power being emitted from the central speaker, the central speaker will have a reduced effect in locating the sound image in a desired position (in the front within a vehicle). As a result, with a conventional speaker system, it is difficult to locate a sound image in the front within a vehicle and at the same time to ensure a good feeling of desired sound spreading.

SUMMARY OF THE INVENTION

It is an object of the present invention to provide an improved automobile speaker system capable of locating a sound image in the front within a vehicle and at the same time to ensure a good feeling of desired sound spreading, so as to solve the above-mentioned problems peculiar to the above-mentioned prior arts.

According to the present invention, there is provided an improved speaker system for use in an automobile vehicle, said speaker system comprising: a pair of side speakers disposed on left and right sides in a front section within the automobile vehicle, said side speakers being provided to convert electric signals transmitted through left and right channels into sound signals; a central speaker disposed in a middle position between the two side speakers, said central speaker being provided to convert into sound signal a sum signal obtained by adding together the electric signals transmitted through the left and right channels; a pair of delay circuits connected on two signal lines leading to the side speakers disposed on the left and right sides within the vehicle, said delay circuits being provided to render the sound signals from the two side speakers to be emitted at a later time than the sound signal from the central speaker; an adder connected between the left and right channels to add together the electric signals transmitted from the left and right channels so as to produce a sum signal; and a band pass filter connected on a signal line leading to the central speaker, said band pass filter being constructed and adjusted to eliminate a high frequency signal component. The sum signal fed from the adder is passed through the band pass filter to extract a middle frequency signal component which is then applied to the central speaker.

According to one aspect of the present invention, the middle frequency signal component is a signal component having a frequency in a range of, for example, about 200 Hz to about 2 KHz.

According to another aspect of the present invention, a time delay of each delay circuit is set to be about 3.5 ms, so that the sound signals from the two side speakers are emitted about 3.5 ms later than the sound signal from the central speaker.

According to a further aspect of the present invention, the speaker system further includes a pair of auxiliary speakers connected to the two signal lines leading to the two side speakers disposed on the left and right sides within the automobile vehicle.

According to a still further aspect of the present invention, each auxiliary speaker is provided with a high pass filter to extract a high frequency signal component.

The above objects and features of the present invention will become more understood from the following description with reference to the accompanying drawings.

DETAILED DESCRIPTION OF THE PREFERRED EMBODIMENTS

Figure 1:
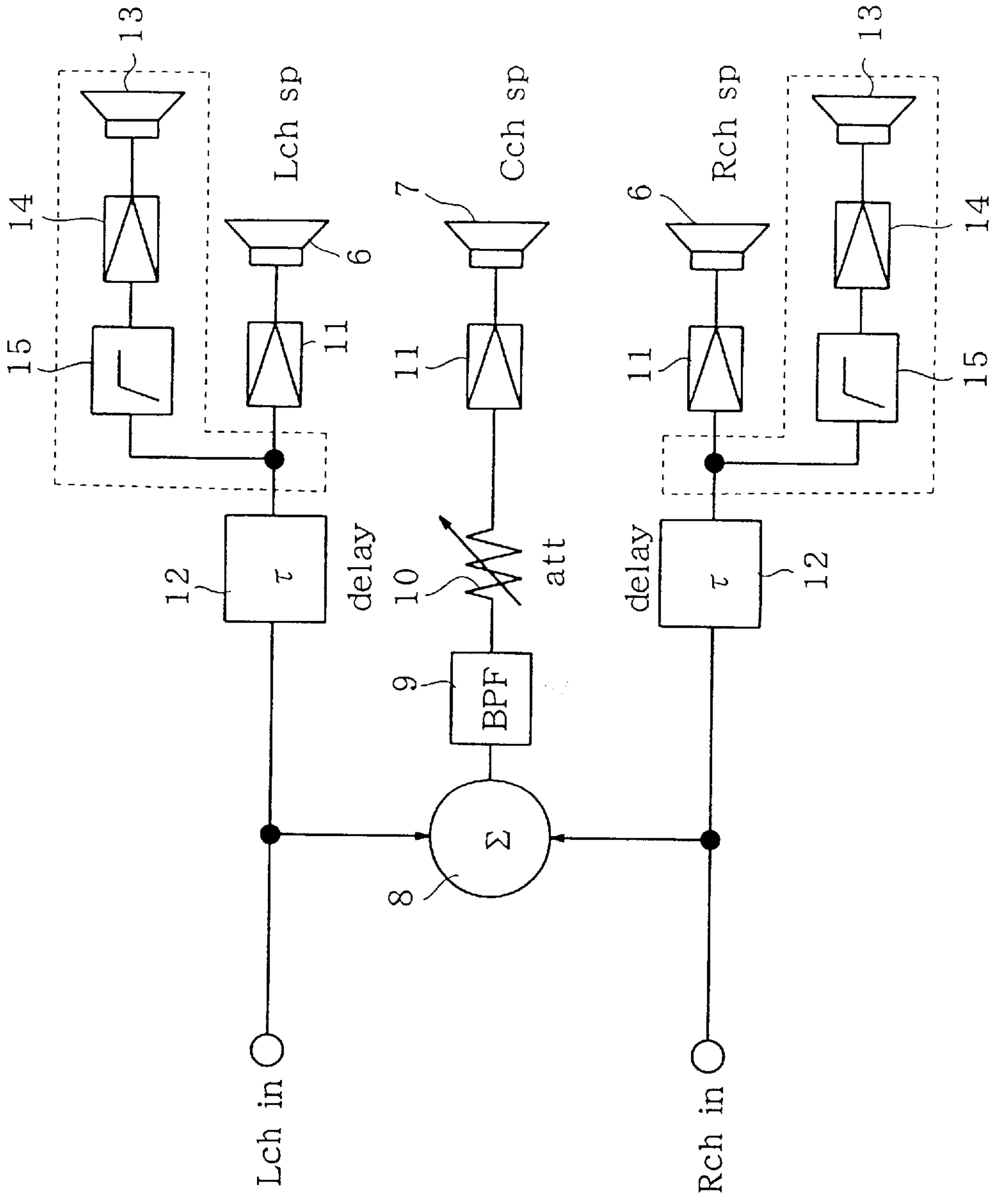
FIG. 1 is a block diagram showing a speaker system constituted according to the present invention.
Figure 2:
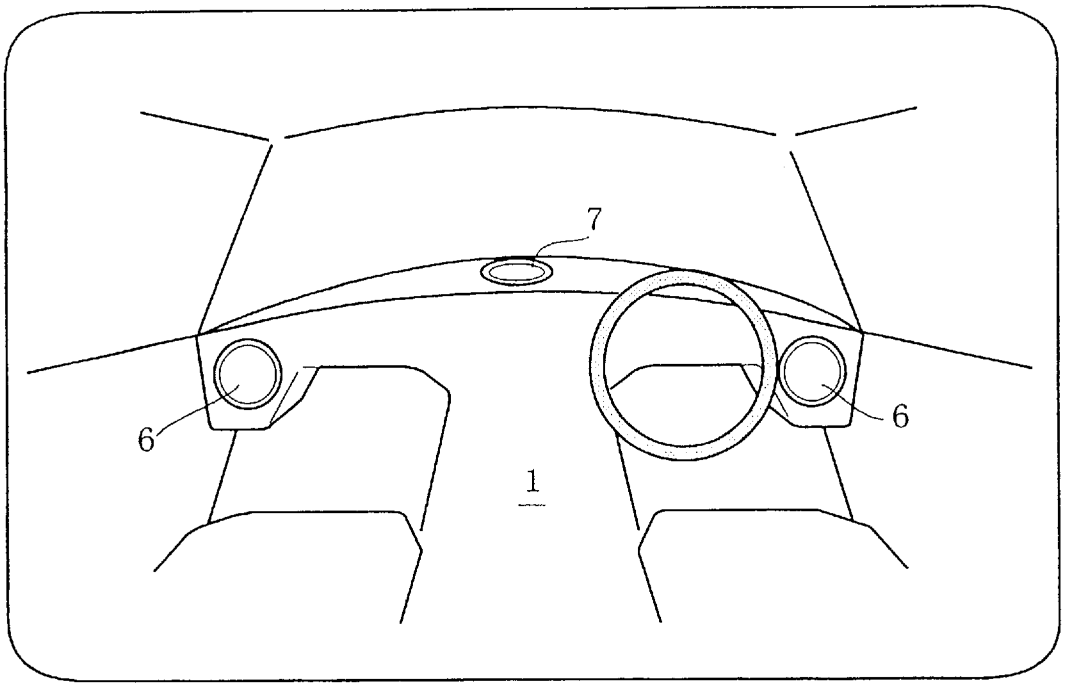
FIG. 2 is a schematic perspective view showing an arrangement of speakers involved in the speaker system of FIG. 1.
Figure 3:
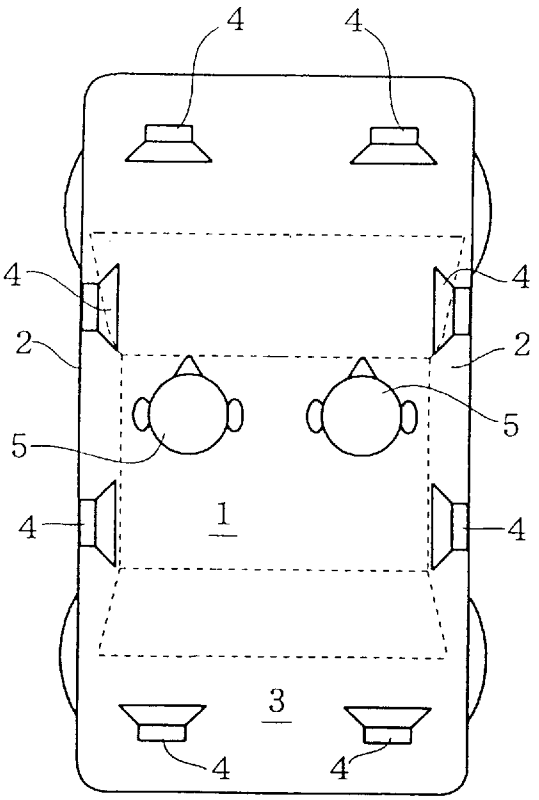
FIG.3 PRIOR ART
FIG. 3 is a plane view showing a conventional multi-speaker system according to prior art.

Referring to FIGS. 1 and 2, a speaker system according to a first embodiment of the present invention, includes a pair of side speakers 6,6 disposed on the right and left sides within an automobile vehicle 1, a central speaker 7 disposed in a position between the two side speakers 6,6. The pair of side speakers 6,6 are provided to convert electric signals transmitted from right/left channels into audio signals. The central speaker 7 is also capable of converting electric signals transmitted from right/left channels into audio signals. Both the side speakers 6,6 and the central speaker 7 may be conventional speakers. For instance, it is allowed to use an edgeless type phase inversion speaker which is compact in size and has a large output amplitude.

As shown in FIG. 1, an adder 8 is connected on a signal line leading to the central speaker 7. Such an adder 8 is used to add together the electric signals from the left and right channels so as to output a sum signal. Further, the central speaker 7 is provided with an amplifier 11 to amplify the sum signal supplied from the adder 8. Each of the two side speakers 6,6 is also connected with an amplifier 11 to amplify the electric signals from the left or right channel.

Referring again to FIG. 1, a BPF (Band Pass Filter) 9 is provided to be connected with the adder 8 to eliminate a high frequency component contained in the sum signal fed from the adder 8. In detail, the BPF 9 is constructed and adjusted such that it can be used to extract a middle frequency signal component having a frequency of about 200 Hz to about 2 KHz. Therefore, it is sure to obtain a signal component having a frequency of about 1 KHz which is proved to be the most contributive to the positioning of a sound image. In addition, an attenuator 10 is connected with the BPF 9 to slightly reduce the level of a sum signal supplied from the BPF 9, so as to perform a fine adjustment to determine a desired position for a sound image.

Referring further to FIG. 1, each side speaker 6 is connected with a delay circuit 12, so as to delay sound signals transmitted through the left and right channels. In the present invention, the time delay of each delay circuit 12 is set to be about 3.5 ms.

With the effect of the delay circuits 12, 12, the sound signals emitted from the side speakers 6,6 will reach listeners 3.5 ms later than the sound signal emitted from the central speaker 7. As a result, for the listeners it seems as if the two side speakers 6,6 are disposed farther away than the central speaker 7. In this way, although there are a plurality of sound sources, for the listeners it seems as if there is only one sound source. Consequently, a sound image is induced to be collected in the sound signal emitted from the central speaker 7, thus exactly locating the sound image in the front within the vehicle 1.

As is understood from the above, with the effect of the BPF 9, a signal component having a frequency in a range of, for example, about 200 Hz to about 200 KHz, which is here called middle frequency component, can be extracted from the sum signal fed by the adder 8. Therefore, it is sure to extract a signal component having a frequency of about 1 KHz which is proved to be the most contributive to the positioning of a sound image. In this way, the middle frequency component (a sound signal) is emitted from the central speaker 7 at an earlier time than the sound signals emitted from the side speakers 6,6. In fact, the central speaker 7 serves as a sound source capable of emitting the middle frequency component with a high sound pressure.

On the other hand, different from the central speaker 7, the two side speakers 6,6 serve to emit high frequency signal components which are proved to be effective for obtaining a good feeling of desired sound spreading.

In this way, with the use of the speaker system according to the first embodiment of the present invention, it is sure not only to have a-sound image located in the front within an automobile vehicle, but also to obtain a good feeling of desired sound spreading.

A speaker system according to a second embodiment of the present invention is also shown in FIG. 1, which includes the whole speaker system of the first embodiment and two additional sections enclosed in the figure by broken lines.

As shown in FIG. 1, the speaker system of the second embodiment has, in addition to all of the elements involved in the speaker system of the first embodiment, a pair of auxiliary speakers (tweeters) 13,13 which are disposed in positions close to the two side speakers 6,6. In detail, each auxiliary speaker 13 is connected to the signal line of the left channel or the right channel, through an amplifier 14 and a HPF (High Pass Filter) 15. The HPF 15 is provided to extract a high frequency signal component.

With the use of the speaker system according to the second embodiment, it is possible not only to have a sound image located in the front within a vehicle, but also to obtain a further improved feeling of a desired sound spreading with a further improved sound quality.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A speaker system for use in an automobile vehicle, said speaker system comprising:

a pair of side speakers disposed on left and right sides in a front section within the automobile vehicle, said side speakers being provided to convert electric signals transmitted through left and right channels into sound signals;

a central speaker disposed in a middle position between the two side speakers, said central speaker being provided to convert into sound signal a sum signal obtained by adding together the electric signals transmitted through the left and right channels;

a pair of delay circuits connected on two signal lines leading to the side speakers disposed on the left and right sides within the vehicle, said delay circuits being provided to render the sound signals from the two side speakers to be emitted at a later time than the sound signal from the central speaker;

an adder connected between the left and right channels to add together the electric signals transmitted from the left and right channels so as to produce a sum signal; and a band pass filter connected on a signal line leading to the central speaker, said band pass filter being constructed and adjusted to eliminate a high frequency signal component, wherein the sum signal fed from the adder is passed through the band pass filter to extract a middle frequency signal component which is then applied to the central speaker.

2. The speaker system according to claim 1, wherein the middle frequency signal component is a signal component having a frequency in a range about 200 Hz to about 2 KHz.

3. The speaker system according to claim 1, wherein a time delay of each delay circuit is set to be 3.5 ms, so that the sound signals from the two side speakers are emitted about 3.5 ms later than the sound signal from the central speaker.

4. The speaker system according to claim 1, further including a pair of auxiliary speakers connected to the two signal lines leading to the two side speakers disposed on the left and right sides within the automobile vehicle.

5. The speaker system according to claim 4, wherein each auxiliary speaker is provided with a high pass filter to extract a high frequency signal component.

* * * * *